(12) United States Patent
Farwell et al.

(10) Patent No.: US 7,950,408 B2
(45) Date of Patent: May 31, 2011

(54) PRESSURE RELIEF VENT DEVICES

(75) Inventors: Steven Farwell, Owasso, OK (US); Niall Smith, Limerick (IE); Geof Brazier, Woodbury, MN (US)

(73) Assignee: BS&B Safety Systems Limited, Limerick (IE)

( * ) Notice: Subject to any disclaimer, the term of this patent is extended or adjusted under 35 U.S.C. 154(b) by 1021 days.

(21) Appl. No.: 11/633,072

(22) Filed: Dec. 4, 2006

(65) Prior Publication Data

US 2007/0181183 A1    Aug. 9, 2007

Related U.S. Application Data

(60) Provisional application No. 60/741,870, filed on Dec. 5, 2005.

(51) Int. Cl.
*F16K 17/14* (2006.01)
*F16K 17/40* (2006.01)
*B65D 90/36* (2006.01)
*E04B 1/98* (2006.01)

(52) U.S. Cl. ............ 137/15.08; 137/15.19; 137/70; 52/1; 52/98; 220/89.2

(58) Field of Classification Search ............ 137/70, 137/15.08, 15.19; 220/89.2; 52/1, 98
See application file for complete search history.

(56) References Cited

U.S. PATENT DOCUMENTS

| 2,301,365 | A | * | 11/1942 | Bushnell | 220/89.3 |
| 3,258,887 | A | * | 7/1966 | Mostoller | 52/98 |
| 3,637,244 | A | * | 1/1972 | Strizki | 52/98 |
| 3,807,106 | A | * | 4/1974 | Reinhardt et al. | 52/98 |
| 4,027,436 | A | * | 6/1977 | Daly | 52/1 |
| 4,223,490 | A | * | 9/1980 | Medow | 52/98 |
| 4,248,610 | A | * | 2/1981 | Schminke et al. | 52/98 |
| 4,327,241 | A | * | 4/1982 | Obenchain | 52/1 |
| 5,036,632 | A | * | 8/1991 | Short et al. | 52/1 |
| 2,291,374 | A |   | 7/1992 | Canfield | |
| 6,070,365 | A | * | 6/2000 | Leonard | 52/1 |

FOREIGN PATENT DOCUMENTS

| DE | 29 05 959 A1 | 9/1979 |
| GB | 1 580 849 A | 12/1980 |
| GB | 2 095 371 A | 9/1982 |
| GB | 2 231 923 A | 11/1990 |

OTHER PUBLICATIONS

Communication Pursuant to Article 94(3) EPC for European Appln. No. 06 838 865.1-2422 (European Counterpart to U.S. Appl. No. 11/633,072), dated Feb. 12, 2009 (5 pages).
International Search Report from PCT/US2006/046140 dated Apr. 5, 2007 (5 pages).

* cited by examiner

*Primary Examiner* — John Rivell
(74) *Attorney, Agent, or Firm* — Finnegan Henderson Farabow Garrett & Dunner, LLP

(57) ABSTRACT

A pressure relief device is disclosed that is designed to open in response to a pre-determined pressure differential. The pressure relief device includes a panel member, and at least one release mechanism. The release mechanism has a first end, a failure portion configured to fail upon experiencing a predetermined load, and a second end. The at least one release mechanism is configured to hold the panel member against a frame prior to experiencing the predetermined pressure differential.

46 Claims, 13 Drawing Sheets

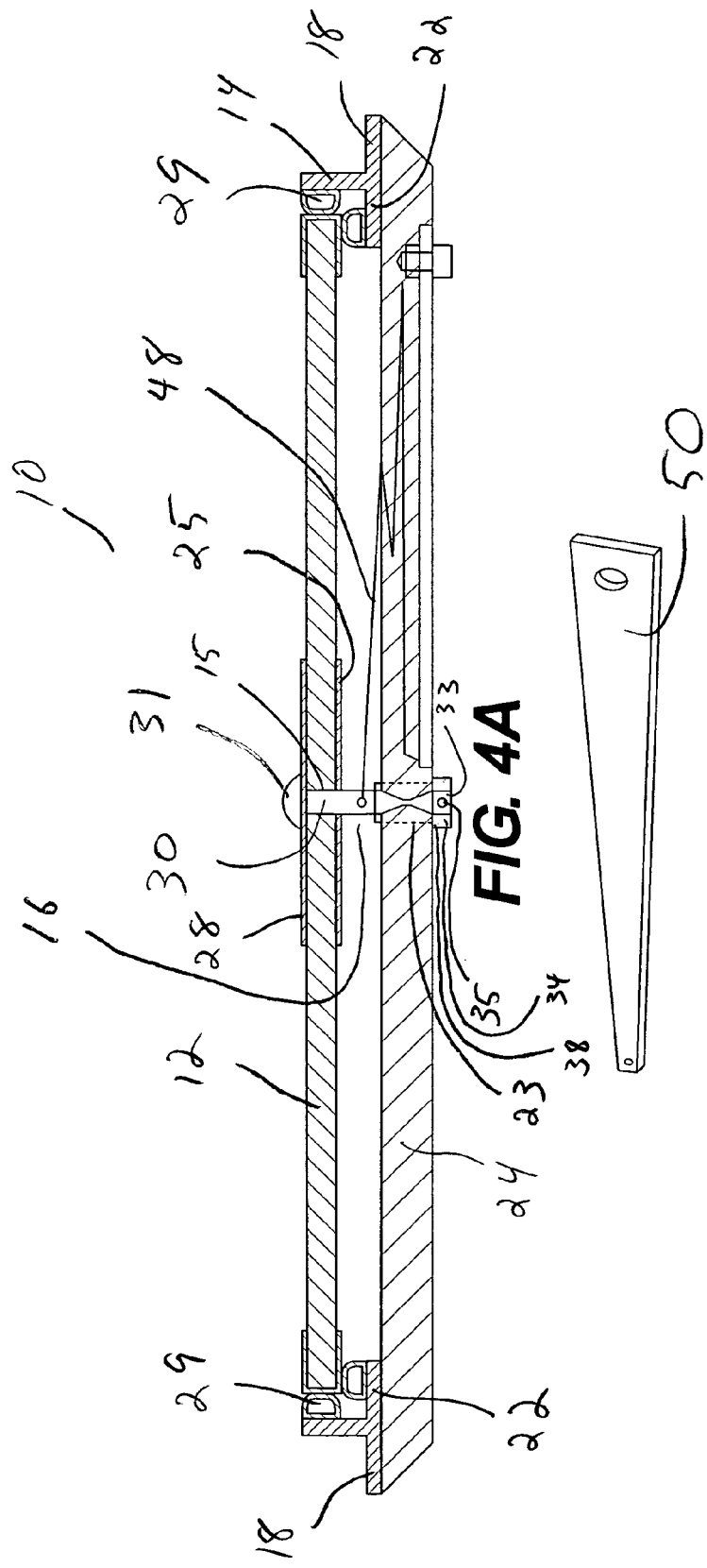

PRESSURE RELIEF VENT DEVICES

CROSS REFERENCE TO RELATED APPLICATIONS

This application claims the benefit of U.S. Provisional Application No. 60/741,870, filed Dec. 5, 2005, under 35 U.S.C. §119(e). The entire disclosure of that provisional application is incorporated by reference herein.

FIELD OF THE INVENTION

This disclosure is directed to the field of pressure relief vents. More particularly, the disclosure relates to pressure relief vents designed to open during an explosion or in response to a pre-determined pressure differential to reduce damage to structures and designed to be installed without the need for on-site testing or calibration of the pre-determined set pressure.

BACKGROUND OF THE INVENTION

Many commercial and industrial processes create the possibility for explosions, even the warehousing of combustible dusts and products that release combustible vapors presents such a risk. Such explosions may damage or destroy any structure that is not designed to resist the considerable pressures generated by a dust or vapor explosion. Deflagration vents, blow out panels, explosion panels, or explosion vents have been employed to lessen any damage to a structure housing potentially dangerous processes when an explosive event occurs by allowing the pressure created in such an explosion to escape through deflagration vents rather than deform and destroy the structure. A pressure relief device is a broad term encompassing all the venting devices described above. The above described venting practices are particularly effective in the case of explosions that propagate below the speed of sound, a deflagration. Industry standards such as NFPA 68 in the United States and the ATEX directive, used in Europe, and related harmonized standards in Europe and elsewhere establish requirements for such protective measures.

Because a temperature, climate, and/or clean controlled environment is desired, and even required by some processes, deflagration vents have been employed that maintain the environmental integrity of the structure. Such vents in the past have been held in place by magnets, spring mechanisms, re-settable latches, or have been constructed of frangible materials. Because the physical properties of magnets, springs and latches can change over time and their application for control of deflagration vent release pressure requires on site calibration, start up testing, periodic testing, and maintenance are required. Periodic testing and maintenance can be intrusive, costly and requires the availability of skilled personnel to take responsibility for the function of such pressure relief devices at all times. On the other hand, vents with integral frangible components are destroyed during an explosive event, very strong winds, or other non-explosive pressure differential causing events. This actuation, whether intended due to a predetermined pressure differential, or inadvertent, due to strong winds or unintended contact, often requires the costly replacement of the entire vent device.

In current vent devices, the venting condition, i.e., the relieving of internal pressure, is dependent on the mass and shape of the combined structure forming (1) the release mechanism(s) holding the vent in a pre-venting configuration when installed and (2) the vent structure itself (i.e., the shape and mass of the vent panel, explosion panel etc.). Therefore, the particular venting condition is necessarily dependent on a force load's effect on the combined release mechanism and vent structure. Due to this dependence, the desired set venting pressure must be configured on a case by case basis requiring costly individualized customization for each pressure relief device as well as testing and maintenance of the venting device to assure accuracy of performance.

It is therefore desirable to have a vent device that does not require set up testing, periodic testing, or other skilled maintenance activities, and is not necessarily destroyed during deployment, either by an explosive or other pressure differential causing event. Additionally, there is a need for a vent device, or other pressure relief device, where the set pressure can be controlled by some factor other than the shape and mass of the combined vent shape and structure. This application describes a solution for these problems.

SUMMARY OF THE INVENTION

One embodiment of the invention is directed to a pressure relief device including a panel member and at least one release mechanism. The release mechanism includes a first end, a second end, and a failure portion configured to fail upon experiencing a predetermined load. The at least one release mechanism is configured to hold the panel member against a frame.

Another embodiment of the invention is directed to a pressure relief device including a frame, a panel member, and at least one release mechanism. The release mechanism includes a first end, a second end, and a failure portion configured to fail upon experiencing a predetermined load. The at least one release mechanism is configured to hold the panel member against a frame.

Another embodiment is directed to a method of installing a pressure relief device including providing a pressure relief device including a frame, a panel member, and at least one release mechanism. The release mechanism includes a first end, a second end, and a failure portion configured to fail upon experiencing a predetermined load. The method includes mounting the frame to an opening in a pressurized system, locating the panel member on an outlet side of the frame, and connecting the panel member to the frame through the release mechanism such that the failure member is located on an inlet side relative to the panel member.

Another embodiment is directed to a method of installing and maintaining a pressure relief device including providing a pressure relief device including a frame, a panel member, and at least one release mechanism. The release mechanism includes a first end, a second end, and a failure portion configured to fail upon experiencing a predetermined load. The method includes mounting the frame to an opening in a pressurized system, locating the panel member on an outlet side of the frame, and connecting the panel member to the frame through the release mechanism. After the occurrence of a predetermined pressure differential between an outlet side and an inlet side of the panel member, the method further includes repositioning the panel member on an outlet side of the frame and replacing at least the failure portion of the release mechanism.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 4A is a cross-sectional view of an exemplary pressure relief device taken through a cross-member of the pressure relief device depicting an installed, preventing arrangement, according to an embodiment of the present disclosure.

FIG. 4B depicts a braking member associated with the device of FIG. 4A.

FIG. 5 is a cross-sectional view of a portion of an exemplary cross-member, during assembly of a pressure relief device, according to an embodiment of the present invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Reference will now be made in detail to exemplary embodiments of the invention including examples illustrated in the accompanying drawings. For the purposes of this disclosure, an explosive event may include any event causing the pressure relief vent to open. Such events may include a dust or gas explosion, any event that causes pressure to build rapidly inside of a structure, a weather event causing a sufficient pressure differential, a physical blow to the vent causing it to open, an HVAC error causing a sufficient pressure differential, other accidental openings, etc.

Figure 1:
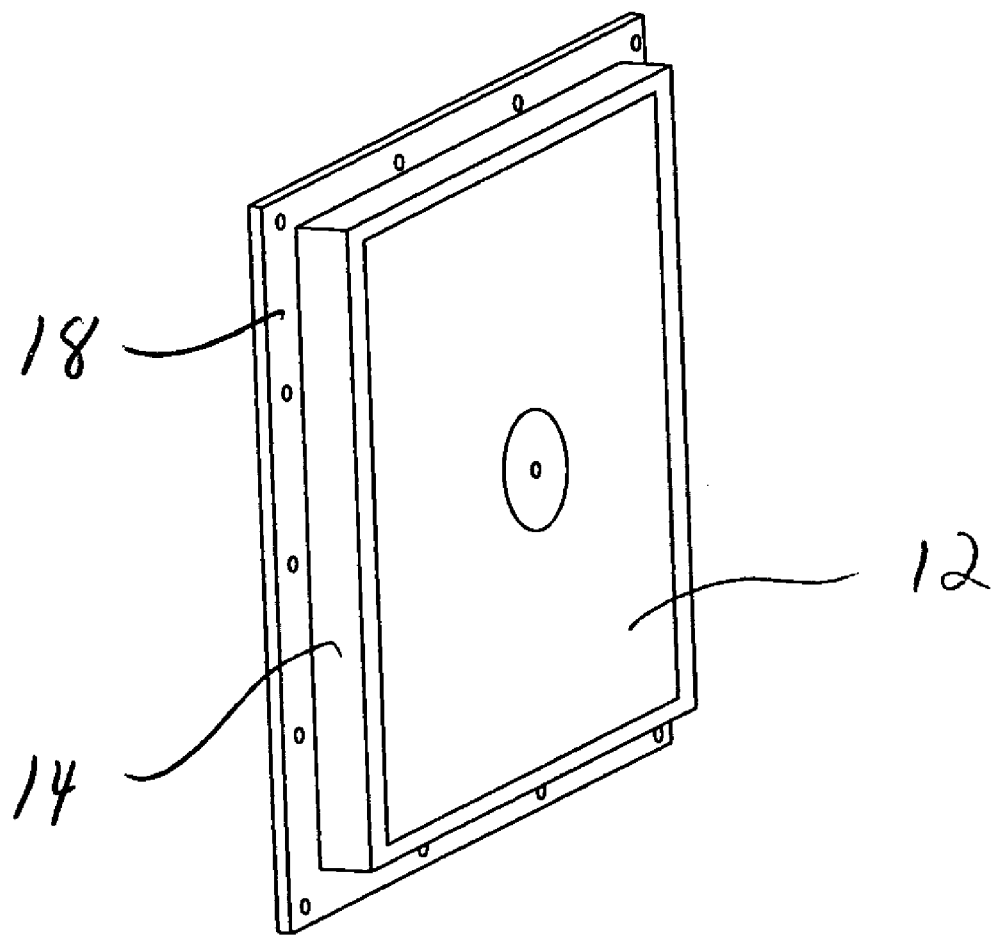
FIG. 1 is a perspective view of an exemplary pressure relief device, according to one embodiment of the present disclosure.

FIG. 1 illustrates an exemplary pressure relief device consistent with the present disclosure. The pressure relief device may comprise, for example, a vent 10. The vent 10 may include a panel member 12, such as a polycarbonate window, held into a frame 14, such as an aluminum frame, with a release mechanism 16 (See FIG. 4). The aluminum frame may be generally made of aluminum "T" stock as shown in FIG. 1. The "T" stock may be arranged such that an outer flange 18 is created around the periphery of the vent 10 allowing installation into a conventional window opening in a building or other commercial or residential structure or other enclosure. The "T" stock arrangement may also provide an inner flange 22 (see FIG. 4) on the inside of the frame 14 to house the polycarbonate window.

Figure 2:
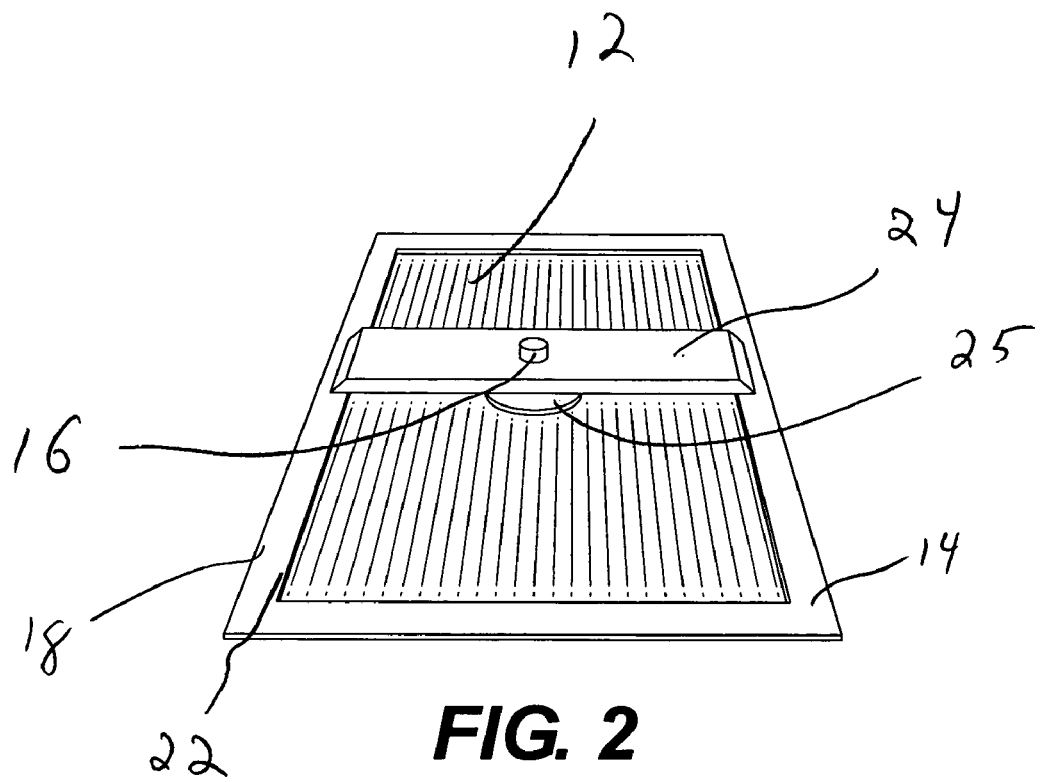
FIG. 2 is a perspective view of an inlet side of an exemplary pressure relief device attached to a separate frame, according to one embodiment of the present disclosure.

FIG. 2 depicts a perspective view of an inlet side of vent 10, which is illustrated as being located within a frame 20 (FIG. 12) representing a portion of a window opening in a building. As seen in FIG. 2, the vent system 10 is installed within the frame 20 of a window opening such that the inner flange 22 and the outer flange 18 are positioned on the inlet side (i.e., facing into the building or structure) relative to the panel member 12. Accordingly, the panel member 12 is installed such that it is positioned on the outlet side (i.e., facing away from the building) relative to the frame 14.

The frame 14 may also have one or more cross members 24 to provide stability and anchor points for a release mechanism 16. The release mechanism 16 will be described in more detail below with reference to FIG. 4. For the purposes of the description of FIG. 2, however, the release mechanism 16 of FIGS. 2-4 extends through the panel member 12 and the cross member 24 in the installed, pre-venting condition. When a predetermined pressure differential exists between the inlet side and the outlet side of the panel member 12 (e.g., when an explosion occurs within the enclosure), the panel member 12 is forced away from the frame 14, toward the outlet direction. The force load applied to the panel member 12 transfers a force to the release mechanism 16.

As will be described in more detail below, the release mechanism 16 is configured to release upon experiencing a predetermined force. When the predetermined pressure differential occurs, the panel member 12 exerts a predetermined force on the release mechanism 16 resulting in separation of the panel member 12 from frame 14 and the cross member 24, thereby safely venting the pressure differential through the opening left within the frame 14. As seen in FIG. 2, the cross member 24 may provide a convenient location for mounting the release mechanism 16. A washer member 25 may contact the inlet side of the panel member 12 and be located on the release mechanism 16 between the panel member 12 and cross member 24. In addition, the cross member 24 may provide enhanced resistance to accidental physical contact along the inlet side of panel member 12, resistance to vacuum pressures, or resistance to strong wind loading on the panel member 12.

Figure 3:
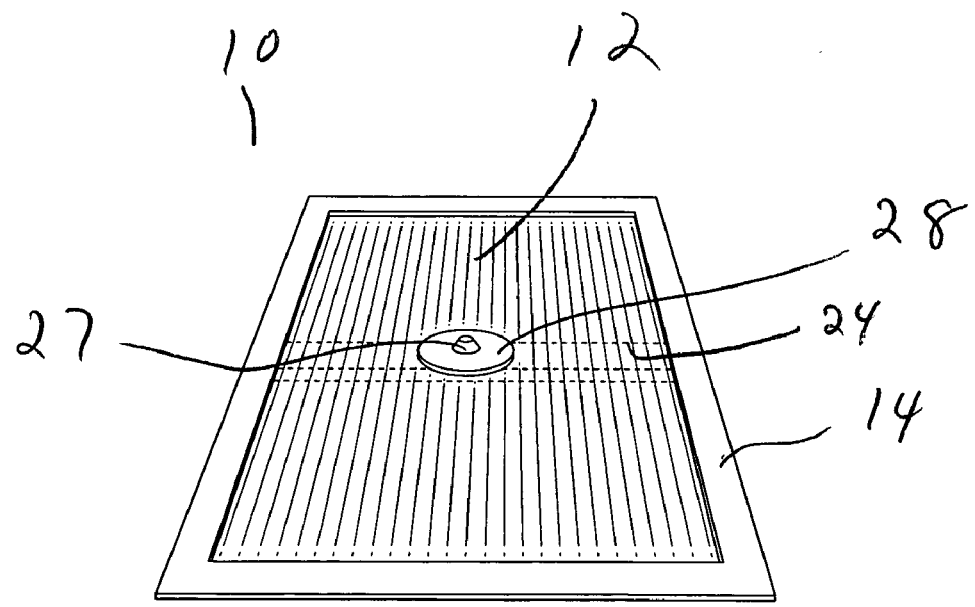
FIG. 3 is a perspective view of an outlet side of the pressure relief device of FIG. 2, according to an embodiment of the present disclosure.

FIG. 3 depicts a perspective view of an outlet side of vent 10, which is illustrated as being located within a frame 20 (FIG. 13) representing a portion of a window opening in a building. As seen in FIG. 3, in one embodiment, a washer member 28 is located on the outlet side of the panel member 12 and receives first end 27 of the release mechanism 16. The washer member 28 serves to distribute force over a larger area of panel member 12 upon occurrence of a predetermined pressure differential. For example, the washer member 28 may be configured to distribute the load of an explosive event across sufficient surface area of the panel member to minimize the possibility of the panel breaking around or pulling off the release mechanism 16. Panel member 12 may be comprised of a transparent material such that the cross member 24 is visible from the outlet side of the panel member 12.

FIG. 4 illustrates a cross-sectional view of the vent system 10 taken through a cross-member 24 of the vent system 10 when the vent system 10 is in an installed, pre-venting configuration. As seen in FIG. 4, the panel member 12 may be sealed against the aluminum frame 14 with gaskets or weather stripping 29. The gasket or weather stripping 29 allows the vent system 10 to be weather-tight. The gasket or weather stripping 29 may also allow for expansion of the panel member 12 as a result of heat, while still allowing sufficient clearance for the panel member 12 to release from the frame 14 if an explosive event occurs. For example, where panel member 12 is a polycarbonate material, heat causes a greater rate of expansion in the panel member 12 than aluminum or other metals used for the frame 14. Accordingly, the weather stripping 29 accounts for estimated expansion and still preserves the required relative spacing to allow for release of the panel member 12 from the frame upon the occurrence of a predetermined pressure differential.

Additionally, where the panel member 12 is a polycarbonate window, it may also be constructed in multiple layers such that it has a thickness giving the polycarbonate window thermal insulation properties, such that the polycarbonate window resists heat passage. The layers and thickness may also provide rigidity and strength such that the polycarbonate window does not break during an explosive event. The polycarbonate window may be constructed such that the polycarbonate window has a unit mass of 0.6 pounds per square foot or lower. A low unit mass may allow for easier shipping and installation and may improve the safety of the deflagration vent by reducing the likelihood of the polycarbonate window becoming a projectile during an explosive event. The polycarbonate window may be transparent, translucent or opaque and may be produced in a variety of colors.

Figure 6:
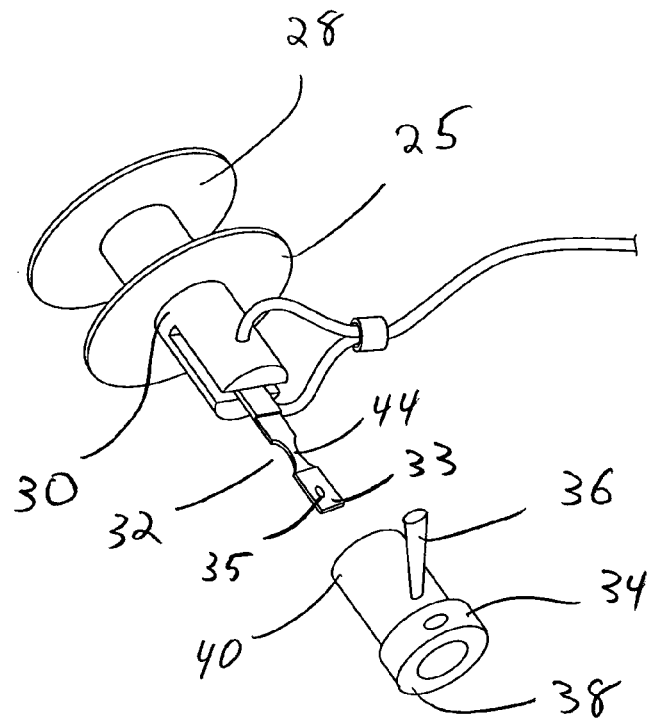
FIG. 6 is an exploded perspective view of an exemplary release mechanism of a pressure relief device, according to an embodiment of the present invention.

As seen in FIG. 4, the panel member 12 may be held against the frame 14 with a release mechanism 16. The release mechanism 16 may pass through an aperture 15 in the panel member 12, as well as through an aperture 23 through the cross member 24 in the frame 14 to hold the panel member 12 tight against the frame 14. With reference to FIGS. 4-6, in one embodiment, the release mechanism 16 comprises a shaft 30 having a first end terminating in a flanged head 31 and a second end terminating in a connector 33 having an aperture 35 therethrough. A failure member 32 (FIG. 6) is located between connector 33 and the flanged head 31. The release mechanism 16 also includes a collar 34 and pin 36. The collar 34 includes a flanged end 38 and a reduced profile end 40. As seen in FIG. 5, the reduced profile end 40 is configured for insertion through aperture 23 of the cross member 24.

During installation of the vent system 10, the collar 34 is inserted through aperture 23 such that the flanged end 38 abuts against the cross member 24. After the panel member 12 is located within the frame 14, the washer member 28 can be aligned with aperture 15 and the shaft 30 is then inserted through aperture 15 such that the flanged head 31 abuts the washer member 28. As depicted in FIGS. 4 and 6, the connector 33 extends through a lumen within the collar 34. The pin 36 can then be inserted through the collar 34 and through the aperture 35 in the connector 33, thereby releasably connecting the panel member 12 to the frame 14 through the release mechanism 16.

In the exemplary embodiment depicted in FIGS. 4-6, the release mechanism 16 includes a failure member 32 comprised of an element having a weakened section 44, whereby the failure member 32 is configured to break upon the application of a predetermined tensile force. Accordingly, when a predetermined pressure differential occurs, the panel member 12 exerts a predetermined tensile force on the failure member 32 resulting in a break along the failure member 32 and allowing separation of the panel member 12 from frame 14 and the cross member 24, thereby safely venting the pressure differential through the opening left within the frame 14. The collar 34 and pin 36, therefore, allow for replacement of the failure member 32 after an explosive event. Accordingly, the predetermined pressure differential can be controlled based on the structure of the replaceable failure member 32 and is not dependent solely on the mass and shape of the panel member 12.

The failure member 32 may be designed such that a weakened section 44 fails at a pre-determined load caused by a pressure differential between the outlet side and the inlet side of the vent system 10. The predetermined failure load may be suitable for a desired application. The particular failure load can be set based on the mass, shape, and material used for the failure member 32. For example, the failure load range may be from about 10 pounds per square foot to 3 pounds per square inch or higher. The failure member 32 may be designed for the particular set of design parameters. For example, the failure load of the failure member 32 may be pre-determined based on the size of the vent panel 12, the particular process or processes that may result in an explosion in the structure, HVAC characteristics of the building or structure, etc.

The failure member 32 may be constructed from a material having a stable failure point in a wide range of operating temperatures. Such materials may include nickel alloy 600 series or carbon, for example. A failure member 32 with a stable failure point may eliminate the need to calibrate a deflagration vent or periodically test the deflagration vent once installed. A stable failure point may also allow easy installation in an opening frame 20 with conventional fasteners by an individual without special skills.

The failure portion of the release mechanism depicted in FIGS. 4-6, is only one example, and alternative mechanisms are contemplated. For example, alternative failure portions include, but are not limited to, a breaking shear pin, a buckling pin, a burst element, and a reverse buckling rupture disk. For purposes of this disclosure, where an item is described as configured to fail it is contemplated that this includes degradation of the failure portion material due to applied forces, resulting in breaking, bending, buckling, or other irreversible deformation of the failure portion material. In addition, alternative mechanisms for connecting the collar 34 to the connector 33 are contemplated such as welding, crimping or adhesive bonding.

As shown in FIGS. 5-6, the panel member 12 may be further attached to the frame 14 by a shock cord 48 or cable to prevent the panel member 12 from becoming a projectile or otherwise falling and causing damage to persons or property. The shock cord 48 or cable may also allow easy reinstallation of the panel member by preventing undue damage to the panel member resulting from being expelled from the frame. For example, resilient, elastic properties of a selected cable may allow for sufficient deceleration of the panel 12, much like the response provided by a bungee cord.

The shock cord 48 or cable may be attached to the panel member 12 through the release mechanism 16 or to another point on the panel member. The shock cord 48 or cable may be attached to the cross member 24 (or another location on the structure of frame 14) directly or through a braking member 50. Where the shock cord 48 or cable is constructed of a material having elastic properties, some of the force from the panel member 12 leaving the frame 14 may be absorbed without breaking, snapping, fraying, or otherwise failing. The braking member 50 may also be configured such that it bends as the shock cord 48 pulls against it. In this manner the braking member 50 can absorb some of the kinetic energy force to lessen the likelihood of a shock cord or cable failure or the breaking of the release mechanism 16 from the panel member 12.

Figure 7:
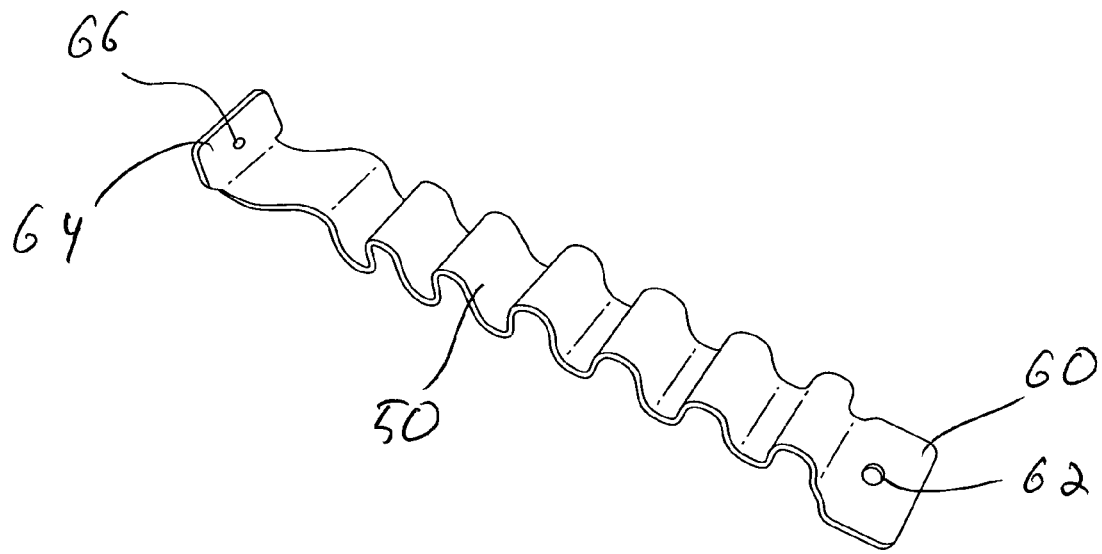
FIG. 7 is a perspective view of an exemplary braking mechanism of a pressure relief device, according to an embodiment of the present invention.

Rather than bending, the material of the brake 50 may comprise a material with relatively high elongation properties, such as, for example, fully annealed aluminum or nickel. In addition, or as an alternative, the shape of the braking member may be modified to facilitate the absorption of kinetic energy. For example, FIG. 7 depicts one configuration of braking member 50 with an alternative shape. As seen in FIG. 7, the braking member has a first end 60 with an aperture 62 to facilitate connection of the braking member 50 to a cross member 24 of the frame 14, for example. The braking member has a second end 64 with an aperture 66 to facilitate connection to the shock cord 48. The second end 64 may be bent (such as, for example, at approximately 90 degrees) relative to the orientation of the first end 60 in order to expose the second end 64 (and aperture 66) to facilitate connection of the shock cord 48.

The braking member 50 may exhibit a wavy shape (e.g., a sinusoidal shape), such that as the braking member is pulled tight by the shock cord 48 after release of the panel 12, the pattern of waves transition to a relatively more straightened pattern. This straightening of the braking member 50 absorbs the kinetic energy of released panel member 12, thereby reducing the impact of the released panel member 12. The elongation of the material and the selection of a particular shape are two criteria that can be optimized to enhance the absorption of energy for braking member 50.

Referring back to FIGS. 2-6, the particular location of the cross member 24 and the release mechanism 16 relative to the panel member 12 can facilitate distribution of force along and across the panel member 12 to enhance the reliability that the vent system 10 will vent at the desired predetermined pressure differential as well as assuring its resistance to operating pressure conditions from both sides. Where the panel member 12 is fully released away from the frame 14 during venting (i.e., as opposed to embodiments where the panel continues to contact a portion of the frame 14 after venting, such as with a hinge), it may be advantageous to locate the aperture 15 and the release mechanism 16 as close as possible to the geometric center of the panel 12.

Referring again to FIG. 2, for example, the panel member 12 is installed within frame 14 such that the release mechanism 16 connects panel 12 to the cross member 24. In the exemplary configuration of FIG. 2, cross member 24 is located at a mid-point between the top and bottom of the vent frame 14. As illustrated, the release mechanism 16 extends through the geometric center of cross member 24 and through the geometric center of panel member 12. By virtue of this relative spacing, any deflection of the panel member 12 caused by the force of fluid pressure against the inlet side of the panel member 12 will be distributed relatively evenly about the four corners of the panel member 12.

For instance, if upon a deflagration event, a relatively large force component was applied to the inlet side of the panel 12 at the extreme upper right-hand location of panel 12, a force moment would be generated at the upper right hand location of the panel 12. The resulting force moment would be applied about a moment arm marked by the distance between the force application location and the location of the release mechanism 16 (i.e. in this case at the geometric center of panel 12). This force moment would be equalized by a reaction force moment resulting from a reaction force at the lower left hand side of the panel member 12 due to the engagement of the lower left-hand corner of the panel member 12 and the inner flange 22 of the frame 14. The final resulting applied force is therefore relatively evenly distributed across the panel member 12 and applied in the outlet direction. This resulting force is then transferred to act on the release mechanism 16 in the outlet direction. Accordingly, due to the equalization of force across the panel 12 and the separation of the release mechanism 16 from panel member 12, the actuation of the release mechanism 16 is not dependent on the mass and shape of the panel member 12. In the event of an increase in pressure applied to the inlet of the panel member 12, the flexibility of the material may allow it to move in an outward direction away from the inner flange 22 of the frame 14. By locating the release mechanism 16 at the geometric center of the vent, such deflection is minimized allowing the seal 29 to control leakage between inlet and outlet sides of panel member 12.

The location of the aperture 23 in the cross member is less important where there is no concern regarding normal operating pressures applied to the inlet side of the panel member (or concerning vacuum pressures applied to the outlet side of the panel member 12). For example, in a system where a certain pressure differential will always be applied in a certain anticipated conformation, centering of the aperture 23 would not be useful.

Figure 8:
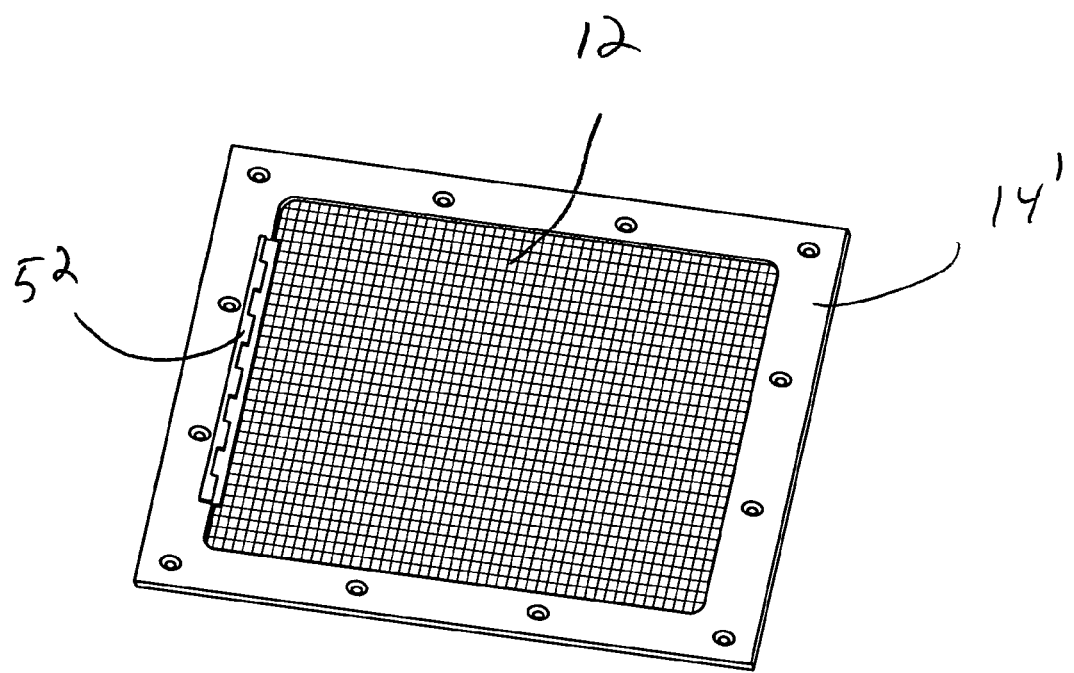
FIG. 8 is a perspective view of an outlet side of an exemplary pressure relief device, according to another embodiment of the present disclosure.

FIG. 8 is a perspective view of an outlet side of another embodiment of a pressure relief device. As seen in FIG. 8, the panel member may be further attached to the frame 14' with a hinge 52. The hinge 52 may be located at the top of the frame 14' to allow the panel member to swing outward and upward during a pressure differential. The release mechanism may be located at or near the bottom of the panel member on the side away from the hinge 52. In some embodiments, the panel member 12 may be a polycarbonate window attached to the frame 14' with both a shock cord or cable and a hinge to minimize damage to the vent during deployment. For example, the embodiment of FIG. 8 may also include a cross member 23 integrally formed as part of the frame 14'. Just as in the embodiment of FIG. 8, the shock cord could connect between the cross member and the panel member. Where the hinged embodiment includes a cross member, the cross member could be located anywhere between the end of the frame 14' opposite the hinge and approximately the midway point between the opposite end and the hinge location.

Figure 9A:
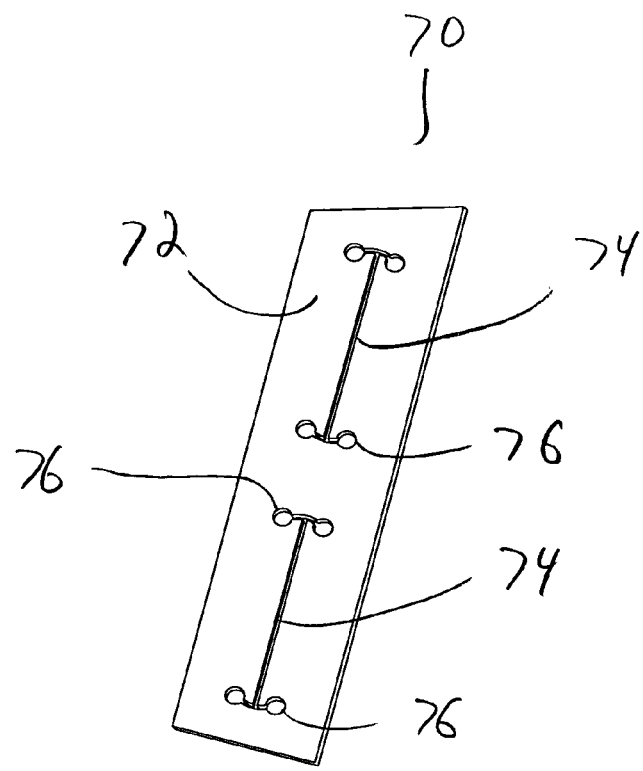
FIG. 9A depicts one exemplary hinge for use in a pressure relief device, according to an embodiment of the present disclosure.
Figure 9B:
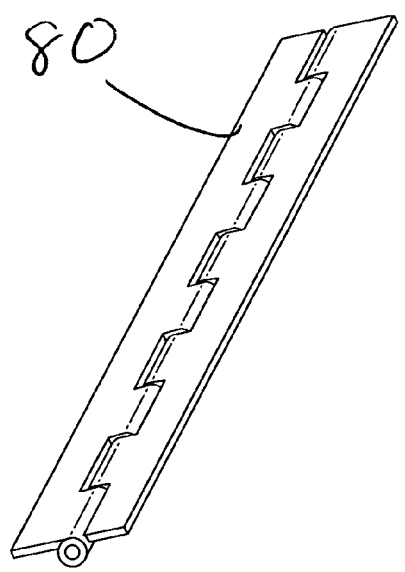
FIG. 9B depicts another exemplary hinge for use in a pressure relief device, according to an embodiment of the present disclosure.

FIG. 9A illustrates an exemplary hinge 70 for use in an embodiment where a vent panel is attached to a frame by virtue of the hinge 70. For example, hinge 70 may be comprised of a metal strip 72 formed with a number of slots 74 (or otherwise weakened material, such at linear scoring or a series of linear spaced apertures) formed therein. The hinge 70 can then be configured to bend about the line following the pattern of slots 74. One portion of the hinge 70, on a first side of the slots 74, can be connected to the vent frame 14, while a second side of the slots 74 can be connected to the panel member. The hinge 70 may be provided with stress distribution features 76 at the terminal portions of the slots 74. The stress distribution features 76 may prevent the tearing or separation of the hinge material along the path of the slots 74. The stress distribution features 76 can by any stress distribution feature described in commonly-owned U.S. Pat. No. 6,792,964 B2, the entire contents of which are hereby incorporated by reference. Alternatively, a hinge may be provided by integrally connecting the panel member to one side of the frame, similar to explosion panel embodiments described in U.S. Pat. No. 6,792,964 B2.

Where the panel member is formed of a polymer material or a carbon fiber, a portion of the hinge may be bonded or otherwise integrally incorporated into the panel member to enhance the retention of the panel member to the hinge after a venting event. As seen in FIG. 9B, an additional non-limiting example of a hinge device comprises an intermeshed, two-piece piano hinge arrangement 80. In a piano hinge arrangement, two members rotate relative to each other in the same manner that the piano key cover rotates relative to the rest of the piano structure.

Figure 10:
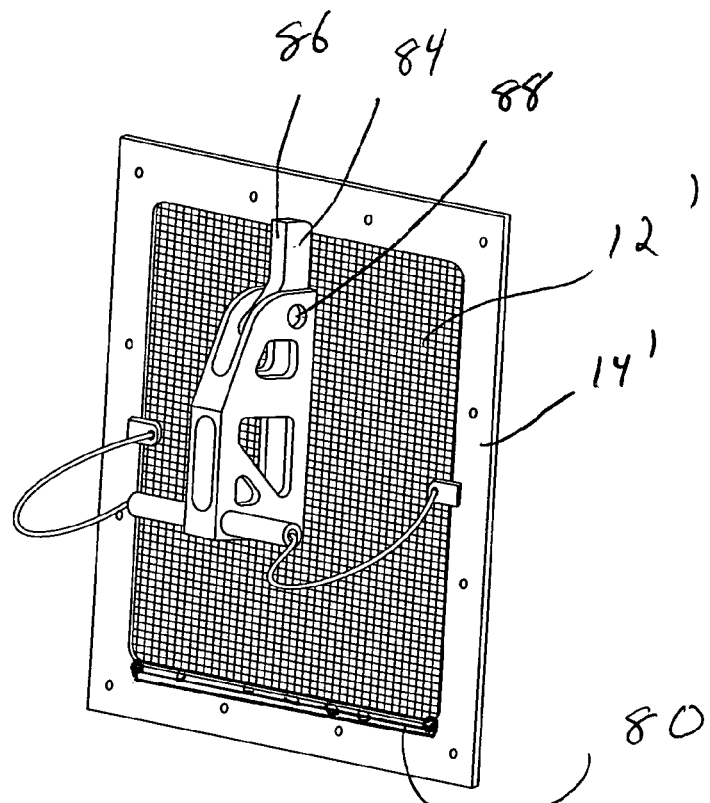
FIG. 10 is a perspective view of an inlet side of an exemplary pressure relief device, according to another embodiment of the present disclosure.

FIG. 10 is a perspective view of an inlet side of another exemplary pressure relief device. As seen in FIG. 10, there is disclosed a frame 14' and a panel member 12'. A support block 82 is mounted onto the panel member 12' and houses a latch device 84. The latch device 84 includes a lever arm 86 configured to rotate approximately 90 degrees relative to a pivot point 88 on the support block 82 from its installed pre-venting position illustrated in FIG. 10. As the level arm is loaded, it impinges upon a control member within support block 84 which, when sufficient pressure differential is applied across panel member 12', it will activate allowing the lever arm to rotate and the panel member to open. The control member may be a breaking or shear pin, a buckling pin, a burst member or reverse buckling disk.

Figure 11:
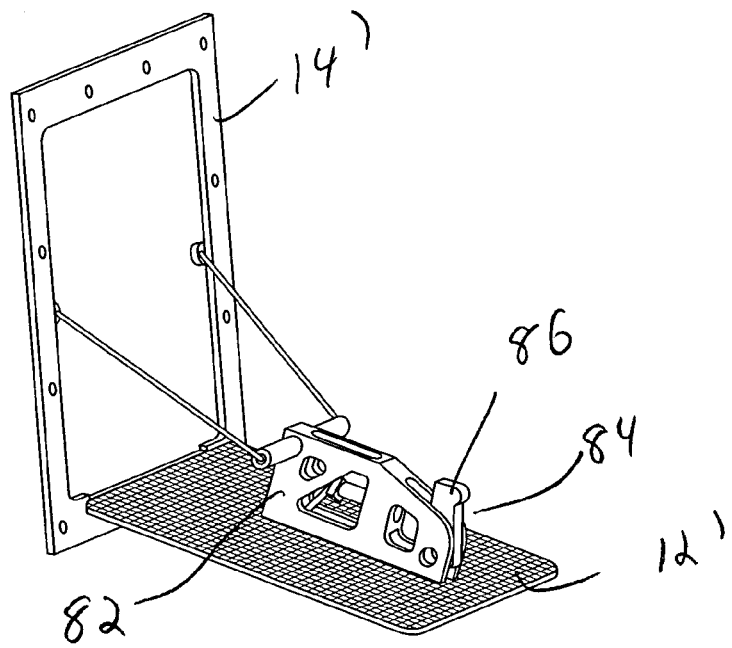
FIG. 11 is a perspective view of the pressure relief device of FIG. 10 in a post-venting configuration, according to an embodiment of the present disclosure.
Figure 12C:
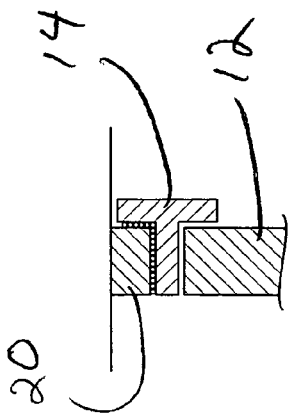
FIGS. 12A-12E illustrate schematic charts of an exemplary method of installing a pressure relief device, according to an embodiment of the present disclosure.
Figure 12D:
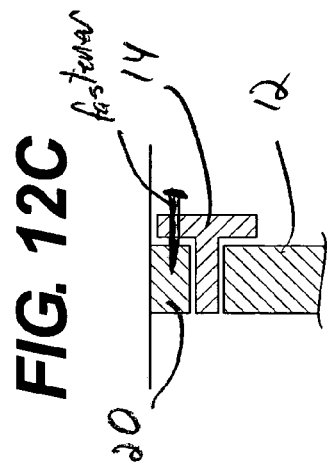
Figure 12E:
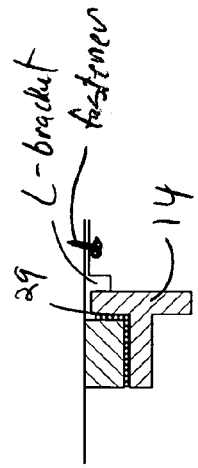
Figure 12A:
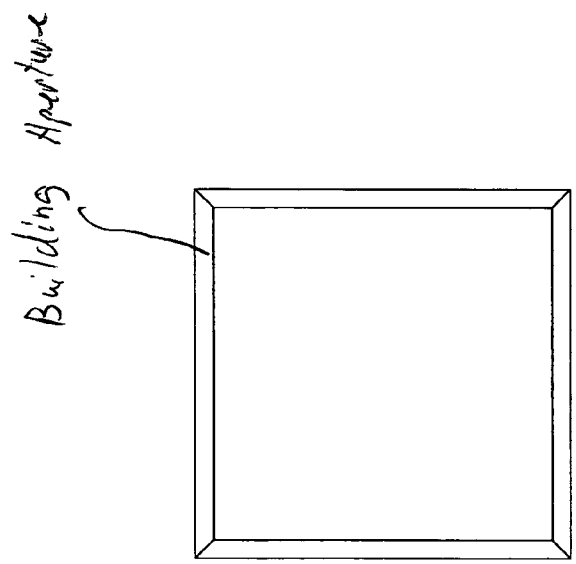
Figure 12B:
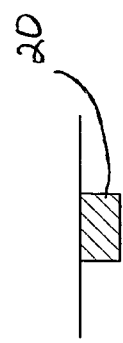

Since an end portion of the lever arm 86 extends to engage a top portion of the frame 14', any force applied via a pressure differential along the inlet side of the panel member 12' generates a force moment that acts to rotate the lever arm 86 relative to support block 82. The lever arm 86 is configured to rotate approximately 90 degrees (relative to the support block) from the position illustrated in FIG. 10 only upon the application of a force moment of a predetermined magnitude. Where a predetermined pressure differential generates the predetermined force moment, lever arm 86 no longer engages any portion of the frame 14' and the panel member is vented to the configuration of FIG. 11.

Figure 13:
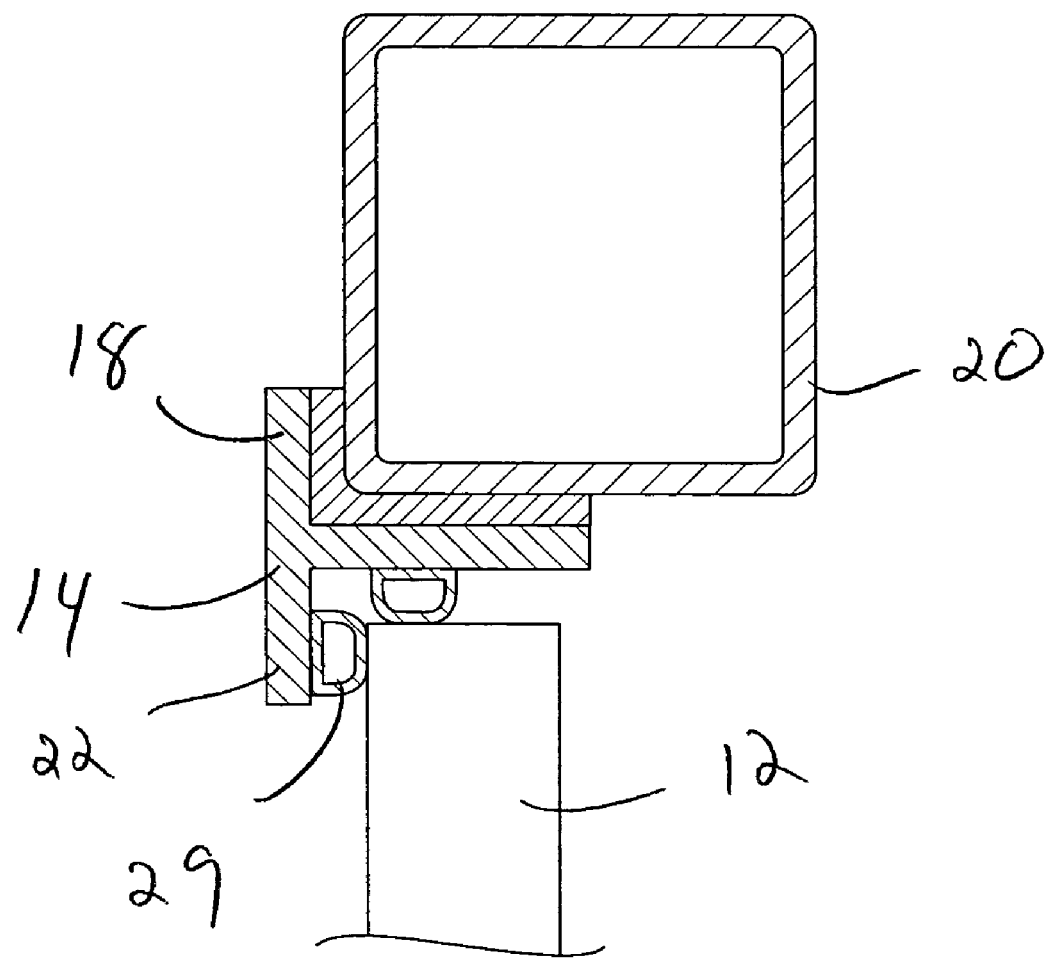
FIG. 13 depicts an exemplary method of installing a pressure relief device, according to an embodiment of the present disclosure.

As shown in FIGS. 12 and 13, the venting system of FIGS. 1-6 can be easily installed in an opening in the building or structure such as an existing window opening, or an opening created for the vent. FIG. 12 shows one exemplary method for installing the vent system 10. The frame 14 may be placed in an existing opening, or the opening may be lined with an appropriate frame material. The frame material may be fastened to the opening with conventional fasteners. The aluminum frame may be placed into the opening and against the walls of the structure or building or against the frame material. Sealant may be used between the aluminum frame and the walls of the structure or building or against the frame material to create a weatherproof seal. The aluminum frame may be held in place with traditional fasteners such as screws, nails, bolts, etc.

In some embodiments, the panel member may be constructed of other materials having appropriate thermal, weight, and structural properties. Similarly, other appropriate materials may be used for the frame members. Such materials may include other metals, plastics, etc. In other embodiments, the release mechanism shaft and washer may be of a unitary construction. In other embodiments, more than one release mechanism may be included in the deflagration vent.

In some embodiments, the panel member may be supplied integral to the frame to allow simple direct installation to an aperture in the structure to be protected. Alternative embodiments may have the panel member, release mechanism and frame supplied independently for assembly during installation.

Figure 14:
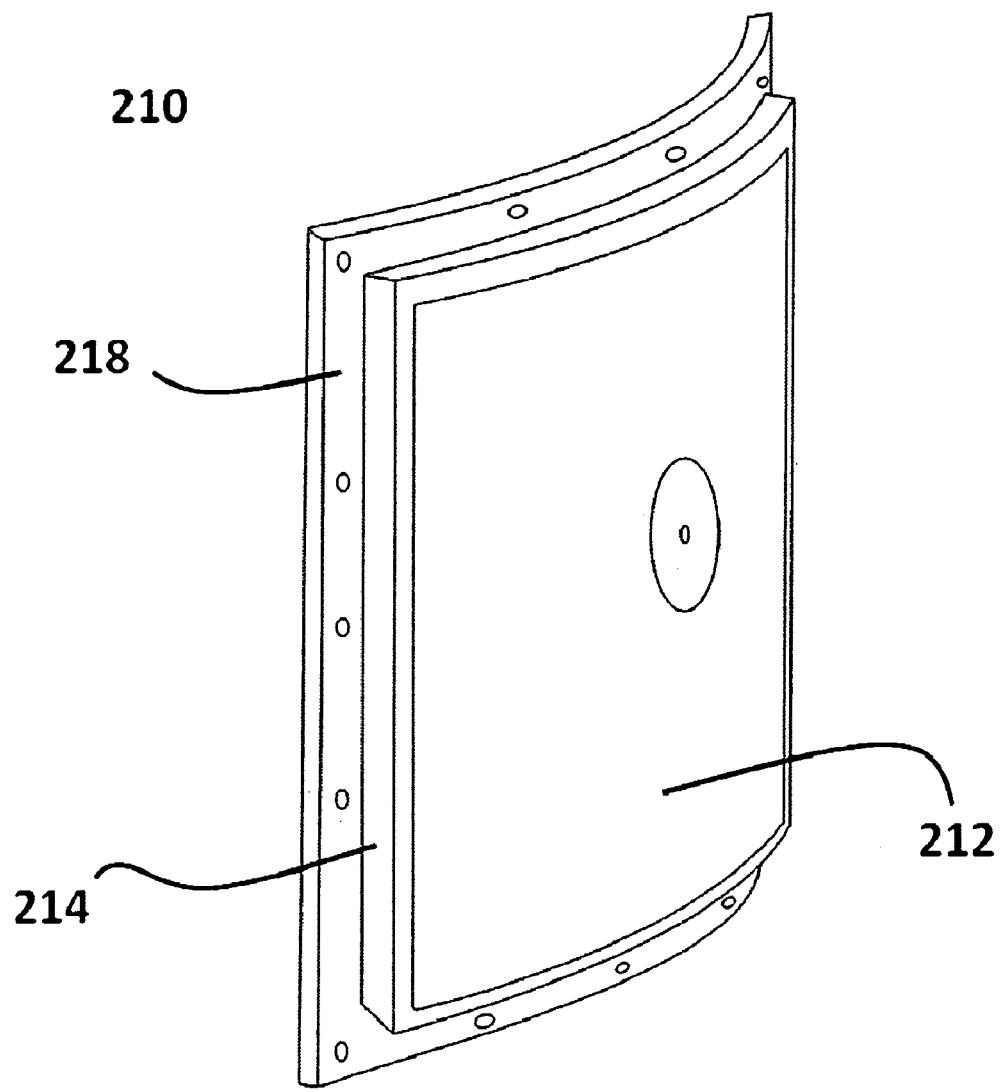
FIG. 14 is a perspective view of an exemplary pressure relief device, according to one embodiment of the present disclosure.
Figure 15:
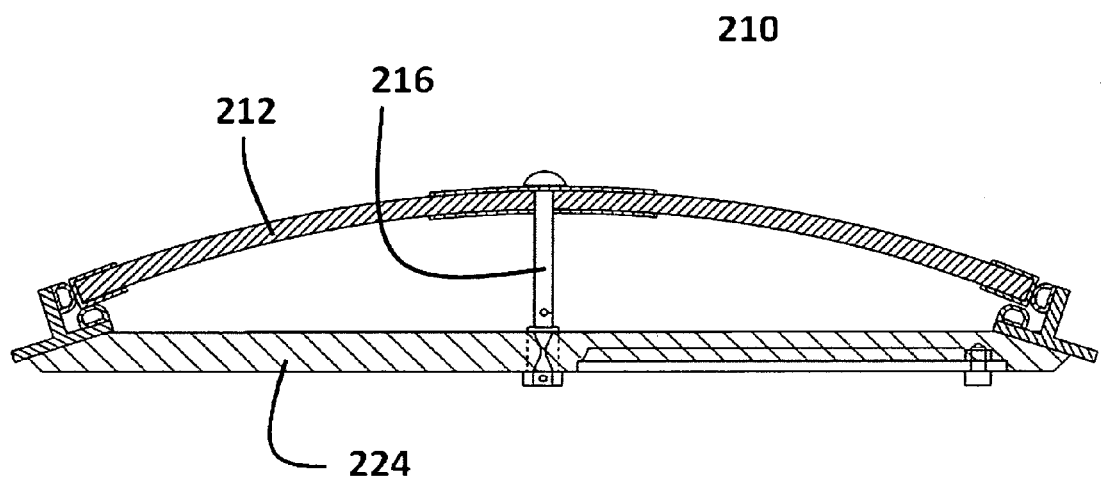
FIG. 15 is a cross-sectional view of an exemplary pressure relief device taken through a cross-member of the pressure relief device depicting an installed curved three-dimensional panel, according to an embodiment of the present disclosure.
Figure 16A:
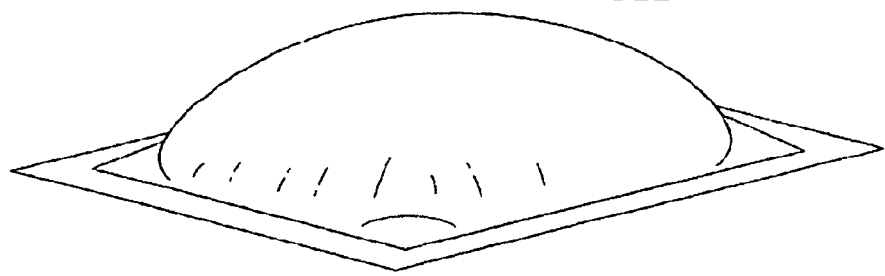
FIGS. 16a-16c are pictorial representations of various panels of curved three-dimensional shapes, as may be used with embodiments of the present disclosure.
Figure 16B:
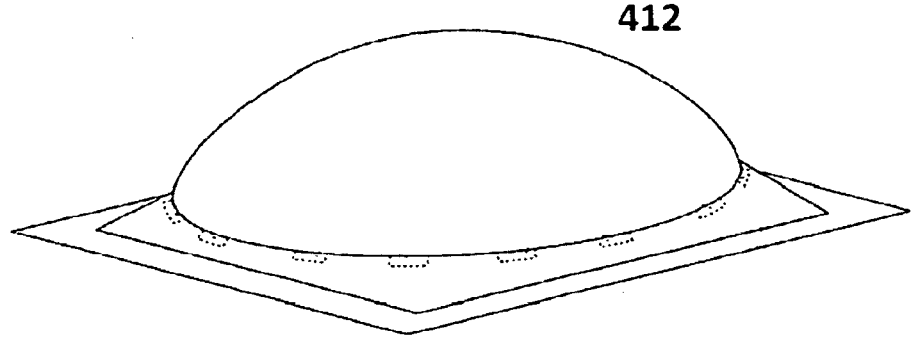
Figure 16C:
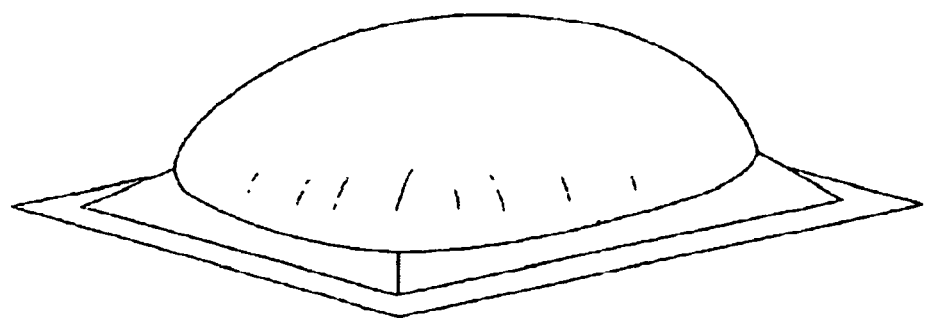
Figure 17:
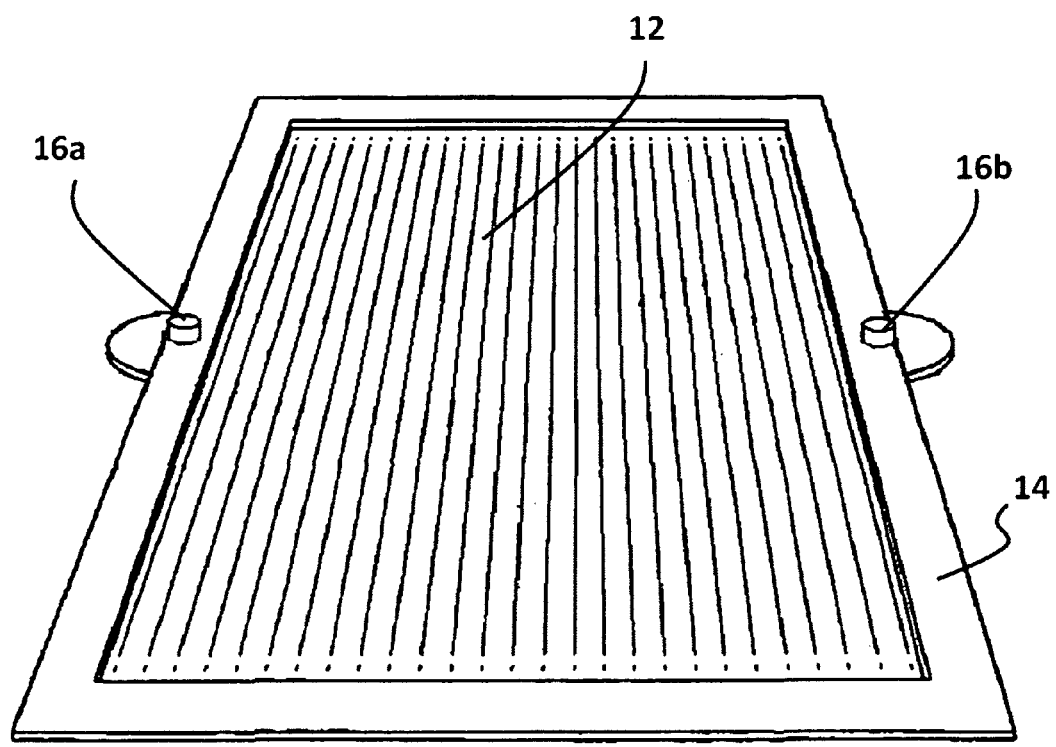
FIG. 17 is a perspective view of an inlet side of an exemplary pressure relief device attached to a separate frame by a plurality of fastening members, according to one embodiment of the present disclosure.

While configured for practical application in the field of building and structure protection, these exemplary embodiments may also be applied to the protection of process equipment and systems such as dust collectors or dryers. In addition, since the predictability of the pressure relief systems described above is not dependent on the mass or shape of the vent panel, this system could be applied to irregular 3-D shapes, such as, for example, an explosion panel for a curved exterior of a cylindrical grain silo. One example of a 3-D curved explosion panel is illustrated in FIGS. 14 and 15, which illustrate a vent system 210. Vent system 210 may include a curved panel member 212 held into a frame 214 with a release mechanism 216, which can anchor to a cross member 224 in the manner described above with regard to vent system 10. Additional examples of a 3-D curved explosion panel are illustrated in FIGS. 16a-16c, which are incorporated from U.S. Pat. No. 6,792,964 B2. Additional examples of potential shapes include, but are not limited to, round, semi-circular, trapezoidal, or any polygon shape. The lack of dependence on the material properties of the panel member itself to regulate opening pressure allows for the use of the present system in systems where the desired release pressure differential is relatively low (unlike in prior systems where magnets or springs were incorporated into the panel structure).

Another advantage of separating the release mechanism function from the material properties and shape of the panel is the potential for a wider choice of materials of construction. Since the vent panel material itself does not control the set release pressure, as for traditional explosion vents, a wider range of mass produced and lower cost materials is available. For example, a plastic vent panel could be provided having a very low cost molded shape to which a release member is added. For example a honeycomb material vent panel could be provided where the vent has a very low mass, resulting in enhanced attributes for dynamic performance across a wide range of set pressures, while still maintaining optimum vent efficiency Additionally, another advantage of separating the release mechanism function from the panel structure is the fact that the system of this disclosure does not require periodic verification of accuracy of performance. This is accomplished by using a permanently calibrated release member, such as, for example, a burst element, a shear pin, a buckling pin, or a breaking pin, rather than devices that change properties with time such as magnets and springs.

In other embodiments, the panel member 12 may be held against the frame 14 by a plurality of release mechanisms 16a and 16b as illustrated in FIG. 17. The plurality of release mechanisms may be spaced apart and located on or near the perimeter of the frame 14 as shown in FIG. 17. In such embodiments, the plurality of release mechanisms may pass through the panel member 12 and the frame 14 to hold the panel member 12 tight against the frame 14.

The previously discussed embodiments are disclosed as exemplary only and not as limiting the scope of the invention to the particular embodiments. Every embodiment disclosed above is not intended to be exclusive or stand alone. For example, it is contemplated that the particular features in any one embodiment can be substituted for, or replaced with, the features of any other embodiment (even though such a particular embodiment may not be explicitly disclosed).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pressure relief device comprising:
   a panel member;
   at least one release mechanism having,
      a first end,
      a failure portion in the form of a flat plate and configured to fail upon experiencing a predetermined load, and
      a second end, and
   wherein the at least one release mechanism is configured to hold the panel member against a frame.

2. The pressure relief device of claim 1, wherein the at least one release mechanism comprises a shaft having a first end terminating in a flanged head and a second end terminating in a connector and wherein the failure portion of the release mechanism is located between the flanged head and the connector.

3. The pressure relief device of claim 2, wherein the release mechanism includes a collar member configured for mounting on a portion of the frame, the collar being configured for releasably attaching to the connector such that upon installation, the flanged head is located on an outlet side of the panel member and the collar is located on an inlet side of the panel member.

4. The pressure relief device of claim 3, wherein the connector includes an aperture and the collar includes an aperture such that upon installation, a pin is inserted through aligned apertures of the connector and the collar, thereby releasably attaching the connector to the collar.

5. The pressure relief device of claim 2, wherein a washer member is located between the flanged head of the release mechanism and the panel member.

6. The pressure relief device of the claim 5, wherein the washer member has a circular shape.

7. The pressure relief device of claim 1, wherein the at least one release mechanism extends through the panel member between an outlet side of the panel member and an inlet side of the panel member.

8. The pressure relief device of claim 7, where the at least one release mechanism extends through an aperture in panel member located approximately at the geometric center of the panel member.

9. The pressure relief device of claim 1, wherein the panel member has a curved three-dimensional shape.

10. The pressure relief device of claim 1, wherein the panel member has a relatively planar, non-curved shape.

11. The pressure relief device of claim 1, wherein the panel member comprises a polycarbonate material.

12. The pressure relief device of claim 1, wherein the panel member comprises a transparent, or translucent material.

13. The pressure relief device of claim 2, further comprising a cable having a first end connected to the shaft and a second end configured for mounting on a portion of the frame.

14. The pressure relief device of claim 13, wherein the cable comprises a resilient elastic material.

15. The pressure relief device of claim 13, wherein the second end of the cable includes a braking member configured for mounting on a portion of the frame.

16. The pressure relief device of claim 15, wherein the braking member comprises a device having a sinusoidal shape.

17. The pressure relief device of claim 15, wherein the braking member is comprised of elastic material configured for elongation upon being subject to a tensile force.

18. The pressure relief device of claim 1, where the pressure relief device includes a plurality of release mechanisms spaced along an exterior of the panel member.

19. A pressure relief device comprising:
   a frame;
   a panel member;
   at least one release mechanism having,
      a first end,
      a failure portion configured to configured to fail upon experiencing a predetermined load, and
      a second end;
   a pin;
   wherein the at least one release mechanism is configured to be releasably attached to the frame by way of the pin; and,
   wherein the release mechanism is configured to hold the panel member against the frame.

20. The pressure relief device of claim 19, wherein the at least one release mechanism comprises a shaft having a first end terminating in a flanged head and a second end terminating in a connector and wherein the failure portion of the release mechanism is located between the flanged head and the connector.

21. The pressure relief device of claim 20, wherein the release mechanism includes a collar member mounting on a portion of the frame, the collar being configured for releasably attaching to the connector such that upon installation, the flanged head is located on an outlet side of the panel member and the collar is located on an inlet side of the panel member.

22. The pressure relief device of claim 21, wherein the connector includes an aperture and the collar includes an aperture such that upon installation, the pin is inserted through aligned apertures of the connector and the collar, thereby releasably attaching the connector to the collar.

23. The pressure relief device of claim 20, wherein the frame includes at least one cross member extending across a portion of the frame and located on an inlet side of the frame relative to the location of the panel member.

24. The pressure relief device of claim 20, wherein the frame includes at least one cross member extending across a portion of the frame and located on an inlet side of the frame relative to the location of the panel member.

25. The pressure relief device of claim 24, wherein the connector is releasably attached to a portion of the cross member.

26. The pressure relief device of claim 19, wherein the frame comprises a material having a "T" shaped cross section.

27. The pressure relief device of claim 20, wherein a washer member is located between the flanged head of the release mechanism and the panel member.

28. The pressure relief device of claim 19, wherein the at least one release mechanism extends through the panel member between an outlet side of the panel member and an inlet side of the panel member.

29. The pressure relief device of claim 28, where the at least one release mechanism extends through an aperture in the panel member located approximately at the geometric center of the panel member.

30. The pressure relief device of claim 23, further comprising a cable having a first end connected to the shaft and a second end connected to a portion of the cross member.

31. The pressure relief device of claim 30, wherein the second end of the cable includes a braking member.

32. The pressure relief device of claim 19, where the pressure relief device includes a plurality of release mechanisms spaced along an exterior of the panel member.

33. A method of installing a pressure relief device comprising:
   providing a pressure relief device including:
      a frame;
      a panel member; and
      at least one release mechanism having, a first end, a flat-plate failure portion configured to fail upon experiencing a predetermined load, and a second end;
   mounting the frame to an opening in a pressurized system;
   locating the panel member on an outlet side of the frame; and
   connecting the panel member to the frame through the release mechanism such that the failure portion is located on an inlet side relative to the panel member.

34. The method of claim 33, wherein connecting the panel member to the frame comprises extending the at least one release mechanism through the panel member between an outlet side of the panel member and an inlet side of the panel member.

35. The pressure relief device of claim 34, wherein connecting the panel member to the frame comprises extending the at least one release mechanism through an aperture in the panel member located approximately at the geometric center of the panel member.

36. The method of claim 33, wherein the frame includes at least one cross member extending across a portion of the frame and located on an inlet side of the frame relative to the location of the panel member and wherein connecting the panel member to the frame comprises releasably attaching a portion of the release mechanism to a portion of the cross member.

37. The method of claim 36, further comprising providing a cable having a first end connected to a portion of the release mechanism and a second end connected to a portion of the cross member.

38. The method of claim 37, further comprising providing a braking member at the second end of the cable and connecting a portion of the braking member to the cross member.

39. A method of installing and maintaining a pressure relief device comprising:
   providing a pressure relief device including:
      a frame;
      a panel member; and
      at least one release mechanism having, a first end, a failure portion configured to fail upon experiencing a predetermined load, and a second end;
   mounting the frame to an opening in a pressurized system;
   locating the panel member on an outlet side of the frame;
   connecting the panel member to the frame through the release mechanism by way of a pin;
   after the occurrence of a predetermined pressure differential between an outlet side and an inlet side of the panel member, repositioning the panel member on an outlet side of the frame and replacing at least the failure portion of the release mechanism.

40. The method of claim 39, wherein connecting the panel member to the frame comprises locating the failure portion on an inlet side relative to the panel member.

41. The method of claim 39, wherein the failure portion comprises one, or a combination of, a breaking shear pin, a buckling pin, a burst element, and a reverse buckling rupture disk.

42. The pressure relief device of claim 39, wherein connecting the panel member to the frame comprises extending the at least one release mechanism through an aperture in the panel member located approximately at the geometric center of the panel member.

43. The method of claim 39, wherein the frame includes at least one cross member extending across a portion of the frame and located on an inlet side of the frame relative to the location of the panel member and wherein connecting the panel member to the frame comprises releasably attaching a portion of the release mechanism to a portion of the cross member.

44. The method of claim 39, further comprising providing a cable having a first end connected to a portion of the release mechanism and a second end connected to a portion of the cross member.

45. The method of claim 44, further comprising providing a braking member at the second end of the cable and connecting a portion of the braking member to the cross member.

46. The method of claim 45, further comprising, after the occurrence of a predetermined pressure differential between an outlet side and an inlet side of the panel member, replacing the braking member with a replacement braking member.

* * * * *